US009280722B2

(12) United States Patent
Abdo et al.

(10) Patent No.: US 9,280,722 B2
(45) Date of Patent: Mar. 8, 2016

(54) ACCELERATING BITMAP REMOTING BY IDENTIFYING AND EXTRACTING 2D PATTERNS FROM SOURCE BITMAPS

(71) Applicant: Microsoft Technology Licensing, LLC, Redmond, WA (US)

(72) Inventors: Nadim Y. Abdo, Redmond, WA (US); Voicu Anton Albu, Bellevue, WA (US); Charles Lawrence Zitnick, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/285,794

(22) Filed: May 23, 2014

(65) Prior Publication Data

US 2014/0254926 A1     Sep. 11, 2014

Related U.S. Application Data

(62) Division of application No. 12/636,304, filed on Dec. 11, 2009, now Pat. No. 8,761,520.

(51) Int. Cl.
  *G06K 9/00*     (2006.01)
  *G06K 9/46*     (2006.01)
  *G06K 9/18*     (2006.01)

(52) U.S. Cl.
  CPC .......... *G06K 9/4604* (2013.01); *G06K 9/00463* (2013.01); *G06K 9/00973* (2013.01); *G06K 9/18* (2013.01); *G06K 9/4652* (2013.01)

(58) Field of Classification Search
  CPC ...... G06K 9/4604; G06K 9/4652; G06K 9/18
  See application file for complete search history.

(56) References Cited

U.S. PATENT DOCUMENTS

| 6,111,583 A | 8/2000 | Yaron et al. | |
| 6,121,970 A * | 9/2000 | Guedalia | G06F 3/14 715/234 |
| 6,545,684 B1 | 4/2003 | Dragony et al. | |
| 6,671,424 B1 * | 12/2003 | Skoll | G06T 1/60 382/305 |
| 7,162,080 B2 * | 1/2007 | Chui et al. | 382/168 |
| 7,369,162 B2 | 5/2008 | Yagi et al. | |

(Continued)

FOREIGN PATENT DOCUMENTS

| JP | 2006135596 A | 5/2006 |
| JP | 2008193580 A | 8/2008 |

OTHER PUBLICATIONS

"Office Action Issued in Japan Patent Application No. 2012-543113", Mailed Date: Sep. 11, 2014, 6 Pages.

(Continued)

*Primary Examiner* — Gregory M Desire
(74) *Attorney, Agent, or Firm* — Danielle Johnston Holmes; Micky Minhas

(57) ABSTRACT

Systems, methods and computer-readable storage media are disclosed for accelerating bitmap remoting by extracting non-grid tiles from source bitmaps. A server takes a source image, identifies possibly repetitive features, and tiles the image. For each tile that contains part of a possibly repetitive feature, the server replaces that part with the dominant color of the tile. The system then sends to a client a combination of new tiles and features, and indications to tiles and features that the client has previously received and stored, along with an indication of how to recreate the image based on the tiles and features.

20 Claims, 9 Drawing Sheets

(56) References Cited

U.S. PATENT DOCUMENTS

| | | | |
|---|---|---|---|
| 7,480,406 B2 | 1/2009 | Aliffi et al. | |
| 7,599,790 B2 * | 10/2009 | Rasmussen | G01C 21/32 340/995.14 |
| 7,987,431 B2 | 7/2011 | Santoro et al. | |
| 8,761,520 B2 | 6/2014 | Abdo et al. | |
| 9,026,615 B1 * | 5/2015 | Sirton | H04L 65/60 709/217 |
| 2003/0158916 A1 | 8/2003 | Cronin et al. | |
| 2004/0165787 A1 | 8/2004 | Perez et al. | |
| 2004/0217980 A1 | 11/2004 | Radburn et al. | |
| 2005/0200867 A1 * | 9/2005 | Faggion | 358/1.9 |
| 2006/0210196 A1 | 9/2006 | Wensley et al. | |
| 2007/0046980 A1 | 3/2007 | Coleman et al. | |
| 2007/0226314 A1 * | 9/2007 | Eick | G06F 17/30896 709/217 |
| 2008/0204478 A1 | 8/2008 | Hung | |
| 2008/0244458 A1 | 10/2008 | Brugiolo et al. | |
| 2008/0250424 A1 | 10/2008 | Brugiolo et al. | |
| 2008/0259076 A1 | 10/2008 | Meinds | |
| 2008/0273787 A1 | 11/2008 | Ducksbury et al. | |
| 2008/0301566 A1 | 12/2008 | Abdo et al. | |
| 2008/0313549 A1 | 12/2008 | Stoyanov et al. | |
| 2009/0024763 A1 | 1/2009 | Stepin et al. | |
| 2009/0154807 A1 * | 6/2009 | Rossato et al. | 382/173 |
| 2009/0189894 A1 | 7/2009 | Petrov et al. | |
| 2009/0245613 A1 | 10/2009 | Wu et al. | |
| 2010/0077058 A1 | 3/2010 | Messer | |
| 2011/0010629 A1 | 1/2011 | Castro et al. | |

OTHER PUBLICATIONS

Another Paradigm Shift: WPF, Terminal Services & Bitmap Remoting, 2009, 1 page, downloaded at: http://shevaspace.blogsoot.com/2008/04/wpf-terminal-services-bitmap_05.html.

Chinese 1st Office Action in Application 201080055796.0, mailed Apr. 29, 2014, 11 pgs.

PCT Written Opinion of the International Searching Authority and International Search Report mailed Jul. 28, 2011 for PCT/US2010/055737 (8 pgs).

U.S. Appl. No. 12/636,304, Amendment and Response filed Nov. 26, 2013, 9 pgs.

U.S. Appl. No. 12/636,304, Amendment and Response filed Mar. 20, 2013, 11 pgs.

U.S. Appl. No. 12/636,304, Amendment and Response filed Aug. 20, 2013, 11 pgs.

U.S. Appl. No. 12/636,304, Notice of Allowance mailed Feb. 14, 2014, 8pgs.

U.S. Appl. No. 12/636,304, Office Action mailed Dec. 20, 2012, 7 pgs.

U.S. Appl. No. 12/636,304, Office Action mailed Jun. 4, 2013, 10 pgs.

U.S. Appl. No. 12/636,304, Office Action mailed Sep. 10, 2013, 6 pgs.

"Second Office Action Issued in Chinese Patent Application No. 201080055796.0", Mailed Date: Jan. 9, 2015, 6 Pages.

* cited by examiner

FIG. 2

Sci/Tech » — 202 — edit ☒ — 206

Critics slam 'GTA IV' without test drive — 204
CNET News.com - 1 hour ago
Many critics started complaining about the violence and sexual content in Rockstar Games' "Grand Theft Auto IV" before even seeing the game.
For Gamers, the Craving Won't Quit New York Times
GTA IV in Ample Supply - For Now Next Generation
Ars Technica - PC World - PC Magazine - BBC News
all 1,011 news articles »

Irish Independent

US ordered to act on polar bear
BBC News - 51 minutes ago
By Richard Black A judge has told the US government to decide within weeks whether to list polar bears as an endangered species. The decision was hailed by conservation groups which have been hounding the government on the issue for years.
Court Forces Government to Move on Polar Bear Status New York Times
Federal Judge Orders Administration to Classify Polar Bear Washington Post
The Associated Press - Reuters Canada - Los Angeles Times - Daily Green
all 226 news articles »

Daily Green

Microsoft mounts Eastern offensive with Xbox 360 price cuts
Ars Technica - 2 hours ago
By Frank Caron | Published: April 29, 2008 - 10:46AM CT If the game industry were a game of Risk, Microsoft would be moving its pieces towards Asia.
Microsoft Cuts Xbox Prices in Asia Wall Street Journal
Xbox 360 gets price cut CVG Online
BetaNews - Gamasutra - CrunchGear - Silicon Alley Insider
all 20 news articles »

dBTechno

FIG. 3A

FIG. 3B

FIG. 4

ACCELERATING BITMAP REMOTING BY IDENTIFYING AND EXTRACTING 2D PATTERNS FROM SOURCE BITMAPS

CROSS REFERENCE TO RELATED APPLICATIONS

This application claims priority to, and is a divisional application of, pending U.S. patent application Ser. No. 12/636,304, filed Dec. 11, 2009, entitled "Accelerating Bitmap Remoting by Identifying and Extracting 2D Patterns from Source Bitmaps," which is hereby incorporated herein by reference in its entirety.

BACKGROUND OF THE INVENTION

Although computers were once isolated and had minimal or little interaction with other computers, computers now interact with a wide variety of other computers through Local Area Networks (LANs), Wide Area Networks (WANs), dial-up connections, and the like. With the wide-spread growth of the Internet, connectivity between computers has become more important and has opened up many new applications and technologies. The growth of large-scale networks, and the wide-spread availability of low-cost personal computers, has fundamentally changed the way that many people work, interact, communicate, and play.

One increasing popular form of networking may generally be referred to as remote presentation systems, which can use protocols such as Remote Desktop Protocol (RDP), Independent Computing Architecture (ICA), and others to share a desktop and other applications with a remote client. Such computing systems typically transmit the keyboard presses and mouse clicks or selections from the client to a server, relaying the screen updates back in the other direction over a network connection (e.g., the Internet). As such, the user has the experience as if their machine is operating as part of a LAN, when in reality the client device is only sent screenshots of the applications as they appear on the server side.

Two common techniques to send graphics data to a client are sending graphic primitives and other operations, which tell a sub-routine on the client side what and how to draw something, and sending a bitmap image to the client for display. Often times, it requires less bandwidth to send a graphics primitive than the visual result of the execution of that graphics primitive. For instance, a text primitive for the 11-character string, "Hello world" could be expressed in 11 Unicode bytes. If each character is to be displayed in a 12-pixel-by-12-pixel area, then the bitmap representation of "Hello world" would require approximately 200-times more bytes to express, and therefore approximately 200-times more bandwidth.

Likewise, the graphics primitive representation of both opaque rectangles, and scrolls of an image require at least an order of magnitude less bandwidth than their bitmap counterparts. A graphics primitive representation of an opaque rectangle typically requires no more than four bytes. The equivalent bitmap representation may be highly compressed, but will still generally require at least a few kilobytes. Likewise, an image scroll (sometimes referred to as a "screen-to-screen blit") may be expressed in a graphics primitive as a command that occupies approximately 10 bytes. The bitmap form of moving an 800-pixel-by-400-pixel window may require up to 1.83 MB (the 800-by-400 pixel area, multiplied by 3 bytes-per-pixel and doubled to account for both the old position and the new position), or approximately 10,000 times the space.

There are times when the graphics primitives are not available to send, such as when a previously stored image is to be sent. In such a case, where a bitmap frame is to be sent to a client (such as an application window), the bitmap frame may be subdivided into tiles. Those tiles are then cached on the client side, and when a tile is repeated between two bitmaps, rather than re-sending the client the tile, the server sends an instruction for the client to display the cached tile. This may greatly reduce the bandwidth costs of a remote presentation session, especially where tiles are frequently repeated.

However, even using these techniques for caching bitmap tiles, the bandwidth requirements of sending bitmaps still greatly exceeds that of sending graphics primitives. Further, there are many cases where caching proves to be ineffective, such as when a window is scrolled a number of pixels that is not an even multiple of the number of pixels in a dimension of a tile—even though the image is still substantially the same, because it does not align with the tiles in the same way, already cached tiles are unusable.

SUMMARY OF THE INVENTION

It would therefore be an improvement over the prior art to reduce the bandwidth required to send bitmap images across a remote presentation session.

In an embodiment of the present disclosure, a server system analyzes an image to be sent in a remote presentation session for possibly repetitive features (either repetitive within the image, or as among a plurality of images that the server will send in the session). These features may include things such as text, and an application's navigation buttons.

The server identifies each instance of a feature within the image by locating segments in the image which have the highest probability of being repeated. Each such found segment is then said to be a feature, and is assigned a hash signature.

Then, the server replaces the area that is occupied by each feature, with a pre-determined value. The pre-determined value can be the dominant color of the area, or a repetition of the neighboring pixels, so as to maximize run-lengths and therefore compression. Then, the server divides the image into tiles.

The server then caches the new features and new tiles. The server determines, which, if any of the features and tiles are already stored on a client computing device of the remote presentation session. Where the client has a feature or tile stored already, the server instructs the client to display it in its appropriate location within the image. Where the client does not have a feature or tile stored already, the server sends it to the client with an indication both to store it and to display it in its appropriate location within the image.

The disclosure encompasses systems, methods and computer-readable storage media for implementing these teachings.

While the disclosure makes reference to "bitmap" images, it may be appreciated that these teachings may be applied to images represented in a variety of formats.

It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail.

Those skilled in the art will appreciate that the summary is illustrative only and is not intended to be in any way limiting.

BRIEF DESCRIPTION OF THE DRAWINGS

The systems, methods, and computer-readable media for accelerating bitmap remoting by extracting non-grid tiles from source bitmaps are further described with reference to the accompanying drawings in which:

FIG. 2 illustrates a sample image to be transmitted in a remote presentation session.

FIG. 3A illustrates the sample image of FIG. 2 after it has been converted to a black-and-white representation of the image.

FIG. 3B illustrates the image of FIG. 3A after it has been segmented to identify one or more features.

FIG. 4 illustrates the identified features of FIG. 3B applied to the sample image of FIG. 2.

DETAILED DESCRIPTION OF ILLUSTRATIVE EMBODIMENTS

Figure 1:
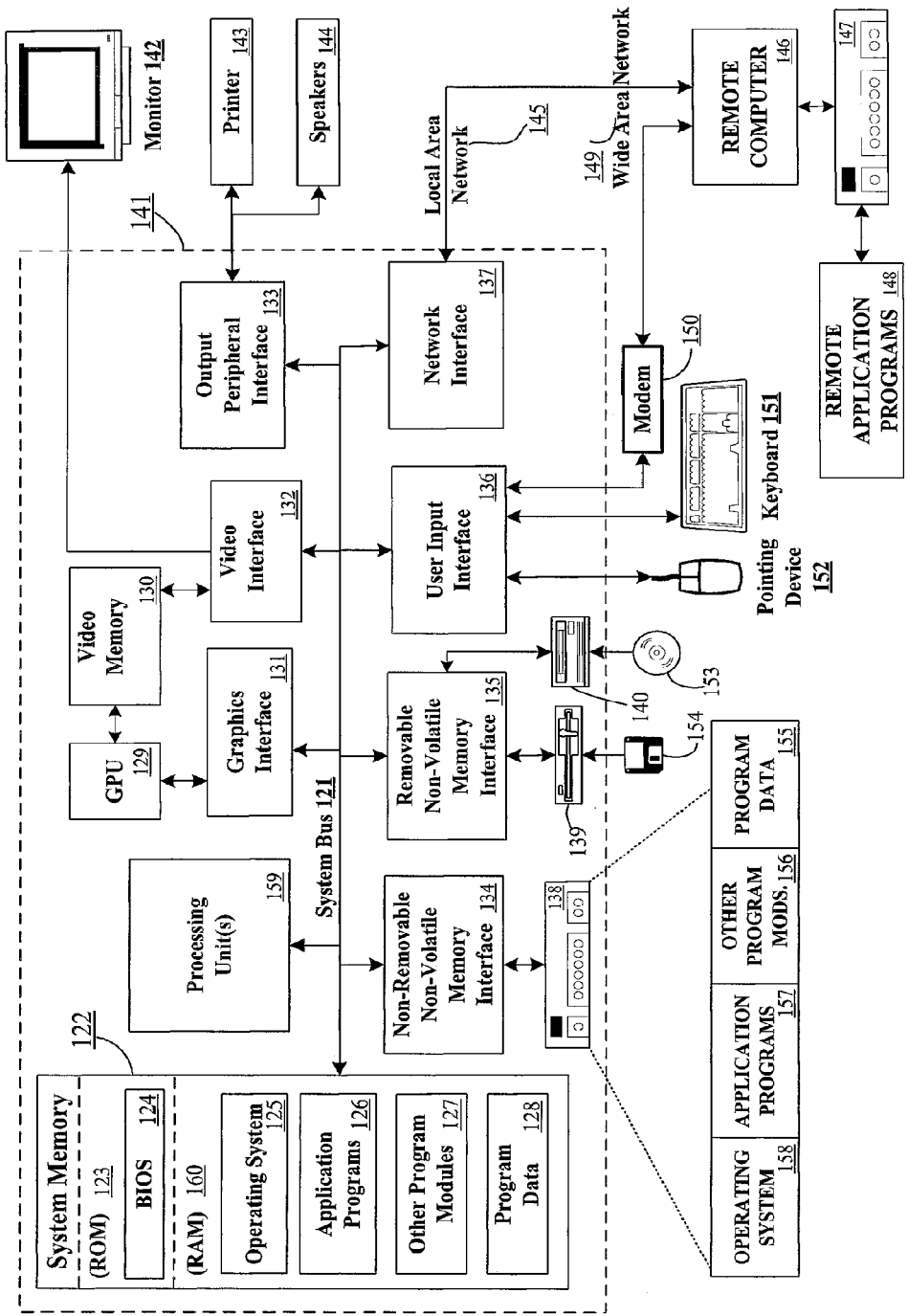
FIG. 1 illustrates an exemplary general purpose computing environment in which in which the techniques described herein may be embodied.

FIG. 1 is a block diagram of a general purpose computing device in which the techniques described herein may be employed. The computing system environment 120 is only one example of a suitable computing environment and is not intended to suggest any limitation as to the scope of use or functionality of the presently disclosed subject matter. Neither should the computing environment 120 be interpreted as having any dependency or requirement relating to any one or combination of components illustrated in the exemplary operating environment 120. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computer 141 typically includes a variety of computer-readable media. Computer-readable media can be any available media that can be accessed by computer 141 and includes both volatile and nonvolatile media, removable and non-removable media. The system memory 122 includes computer-readable storage media in the form of volatile and/or nonvolatile memory such as read only memory (ROM) 123 and random access memory (RAM) 160. A basic input/output system 124 (BIOS), containing the basic routines that help to transfer information between elements within computer 141, such as during start-up, is typically stored in ROM 123. RAM 160 typically contains data and/or program modules that are immediately accessible to and/or presently being operated on by processing unit 159. By way of example, and not limitation, FIG. 1 illustrates operating system 125, application programs 126, other program modules 127, and program data 128.

The computer 141 may also include other removable/non-removable, volatile/nonvolatile computer storage media. By way of example only, FIG. 1 illustrates a hard disk drive 138 that reads from or writes to non-removable, nonvolatile magnetic media, a magnetic disk drive 139 that reads from or writes to a removable, nonvolatile magnetic disk 154, and an optical disk drive 140 that reads from or writes to a removable, nonvolatile optical disk 153 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 138 is typically connected to the system bus 121 through an non-removable memory interface such as interface 134, and magnetic disk drive 139 and optical disk drive 140 are typically connected to the system bus 121 by a removable memory interface, such as interface 135.

The drives and their associated computer storage media discussed above and illustrated in FIG. 1, provide storage of computer-readable instructions, data structures, program modules and other data for the computer 141. In FIG. 1, for example, hard disk drive 138 is illustrated as storing operating system 158, application programs 157, other program modules 156, and program data 155. Note that these components can either be the same as or different from operating system 125, application programs 126, other program modules 127, and program data 128. Operating system 158, application programs 157, other program modules 156, and program data 155 are given different numbers here to illustrate that, at a minimum, they are different copies. A user may enter commands and information into the computer 141 through input devices such as a keyboard 151 and pointing device 152, commonly referred to as a mouse, trackball or touch pad. Other input devices (not shown) may include a microphone, joystick, game pad, satellite dish, scanner, or the like. These and other input devices are often connected to the processing unit 159 through a user input interface 136 that is coupled to the system bus, but may be connected by other interface and bus structures, such as a parallel port, game port or a universal serial bus (USB). A monitor 142 or other type of display device is also connected to the system bus 121 via an interface, such as a video interface 132. In addition to the monitor, computers may also include other peripheral output devices such as speakers 144 and printer 143, which may be connected through a output peripheral interface 133.

The computer 141 may operate in a networked environment using logical connections to one or more remote computers, such as a remote computer 146. The remote computer 146 may be a personal computer, a server, a router, a network PC, a peer device or other common network node, and typically includes many or all of the elements described above relative to the computer 141, although only a memory storage device 147 has been illustrated in FIG. 1. The logical connections depicted in FIG. 1 include a local area network (LAN) 145 and a wide area network (WAN) 149, but may also include other networks. Such networking environments are commonplace in offices, enterprise-wide computer networks, intranets and the Internet.

When used in a LAN networking environment, the computer 141 is connected to the LAN 145 through a network interface or adapter 137. When used in a WAN networking environment, the computer 141 typically includes a modem 150 or other means for establishing communications over the WAN 149, such as the Internet. The modem 150, which may be internal or external, may be connected to the system bus 121 via the user input interface 136, or other appropriate mechanism. In a networked environment, program modules depicted relative to the computer 141, or portions thereof, may be stored in the remote memory storage device. By way of example, and not limitation, FIG. 1 illustrates remote application programs 148 as residing on memory device 147. It will be appreciated that the network connections shown are exemplary and other means of establishing a communications link between the computers may be used.

FIG. 2 illustrates a sample image 202 to be transmitted in a remote presentation session. Image 202 contains both text 204 and a sub-image 206. This image may comprise an entire computer desktop, or some subset thereof, such as a window for an application.

Image 202 may be received by a server from the graphics stack of the server. The server may then process the image according to the following techniques and transmit it to a client with which it is conducting a remote presentation session for display on the client's display device. In an embodiment, the server comprises the computing device of FIG. 1.

FIG. 3A illustrates sample image 202 of FIG. 2 after it has been converted to a black-and-white representation of the image 302. This may be accomplished using a thresholding scheme. In a thresholding scheme, all pixel values (e.g. a red-green-blue (RGB) value) of an image below a threshold may be set to black (in RGB, this may be expressed as hexadecimal 000000), and all pixel values of an image above the threshold may be set to white (in RGB, this may be expressed as hexadecimal FFFFFF).

FIG. 3B illustrates image 302 of FIG. 3A after it has been segmented to identify one or more features 302b. In an embodiment, the server may segment image 202 directly. Depending on specifics of the overall session system—such as available client and server processing resources and bandwidth—the optimal feature size for session performance may vary. In embodiments, a feature may be a word, some subset of a word (including a letter), an application's navigation icon (such as a "print document" button), or a sub-image within the image to be sent in the remote presentation session (such as an image displayed by a web browser when the web browser window is to be sent in the session). A feature may be thought of as having a boundary—a perimeter that encompasses the feature. In the embodiments depicted, the boundaries are rectangular in shape. However, it is possible to use the present techniques with boundaries of a variety of shapes.

In an embodiment, the client discussed herein may comprise the computing device of FIG. 1.

In an embodiment, the server and client communicate in the course of the remote presentation session to determine a feature granularity to be used. This may be negotiated when the server and client initiate the remote presentation session. This may also be renegotiated during the course of the remote presentation session as the parameters of the session change, such as if the client's available processing resources are diminished.

In an embodiment, the server identifies the features of image 302 by processing image 302 with a connected segments algorithm. The connected segments algorithm determines a bounding box for the features of the image. These bounding boxes may then be applied back to image 302 to determine the boundaries of each feature relative to image 302 as a whole.

The server may perform the connected segments algorithm as follows. It labels each pixel of image 302 as being part of text or the background by using an intensity threshold—if the pixel is black or close to black, it is considered text, and otherwise it is considered background (if the image comprised light colored text on a dark background, this would be reversed). The server then finds all 4-connected groups of pixels of those pixels determined to be text. A pixel may be considered to be 4-connected if it is immediately to the right, left, above or below a pixel determined to be text. In an embodiment, the server finds all 8-connected groups of pixels (the 4-connected groups, plus those only connected diagonally) rather than all 4-connected groups of pixels. The server then determines a bounding box for each 4-connected group of text pixels. In an embodiment the bounding box is a rectangle made up of horizontal and vertical lines that encompasses the 4-connected group of pixels such that no smaller bounding box exists.

Figure 4:
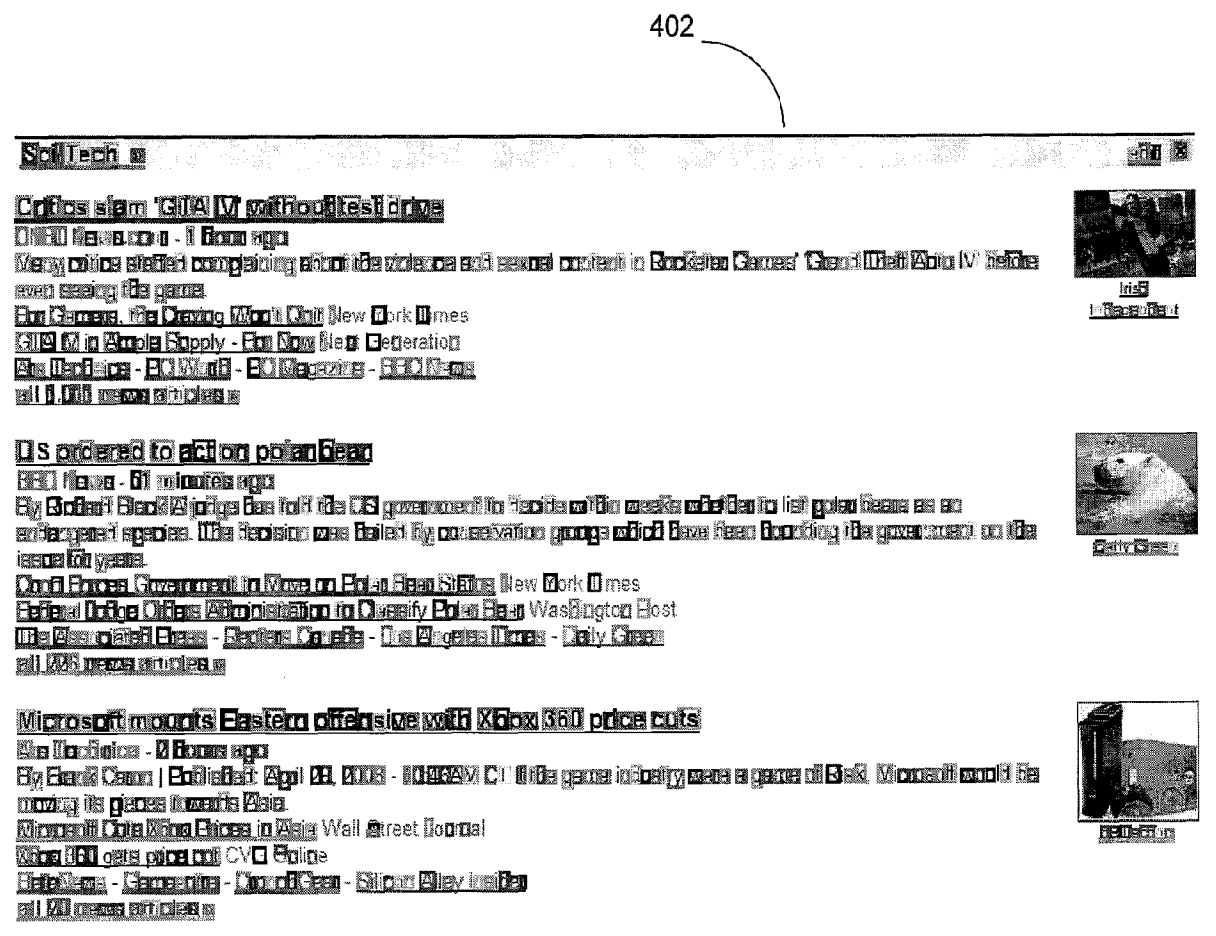

FIG. 4 illustrates in image 402 the identified features of image 302b applied to image 202. When the features are identified relative to original image 202, then that image 202 may be processed to separate the features from the rest of the image.

Figure 5A:
FIG. 5A illustrates another sample image, similar to that of FIG. 2, to be transmitted in a remote presentation session.

FIG. 5A illustrates another sample image 502, similar to that of FIG. 2, to be transmitted in a remote presentation session.

Figure 5B:
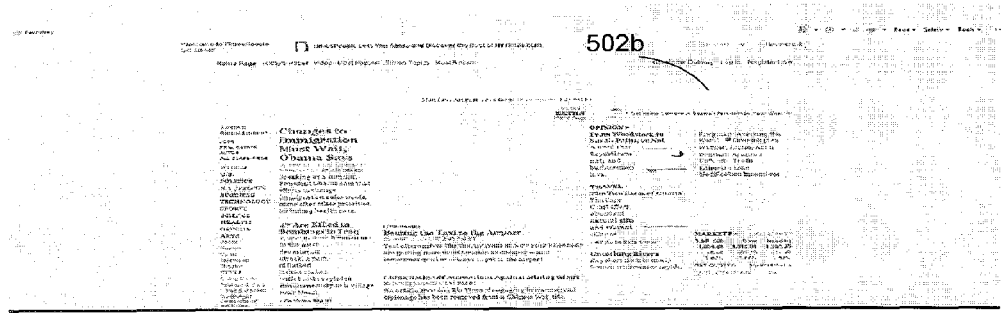
FIG. 5B illustrates a text-only segmentation of the image of FIG. 5A.

FIG. 5B illustrates a text-only segmentation 502b of image 502 of FIG. 5A. It may aid the techniques disclosed herein to separate the text and image portions of image 202 and then perform operations on each sub-image. In an embodiment where this segmentation operation is performed, text-only segmentation may be performed by performing an optical character recognition (OCR) algorithm on the image and removing from the image anything that is not a recognized character.

Figure 5C:
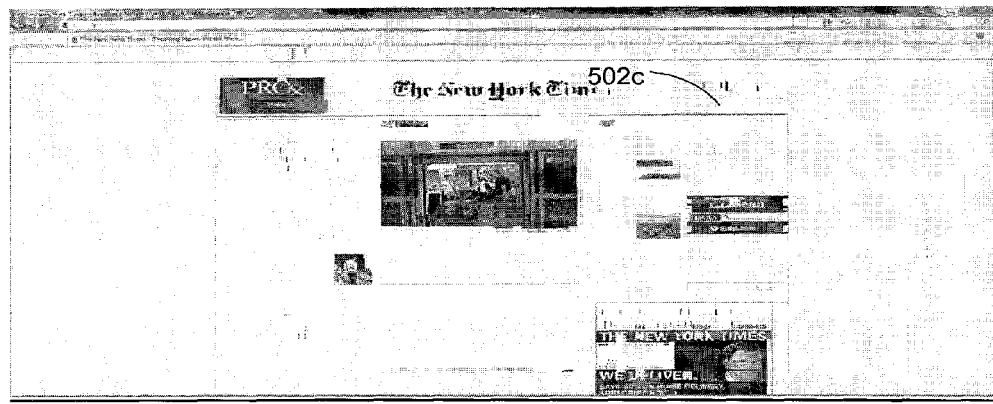
FIG. 5C illustrates a non-text segmentation of the image of FIG. 5A.

FIG. 5C illustrates a non-text segmentation 502c of image 502 of FIG. 5A. Where the server executes the OCR algorithm described in the detailed description of FIG. 5B, the server may produce image 502c by removing every character that the OCR algorithm identifies.

Figure 6A:
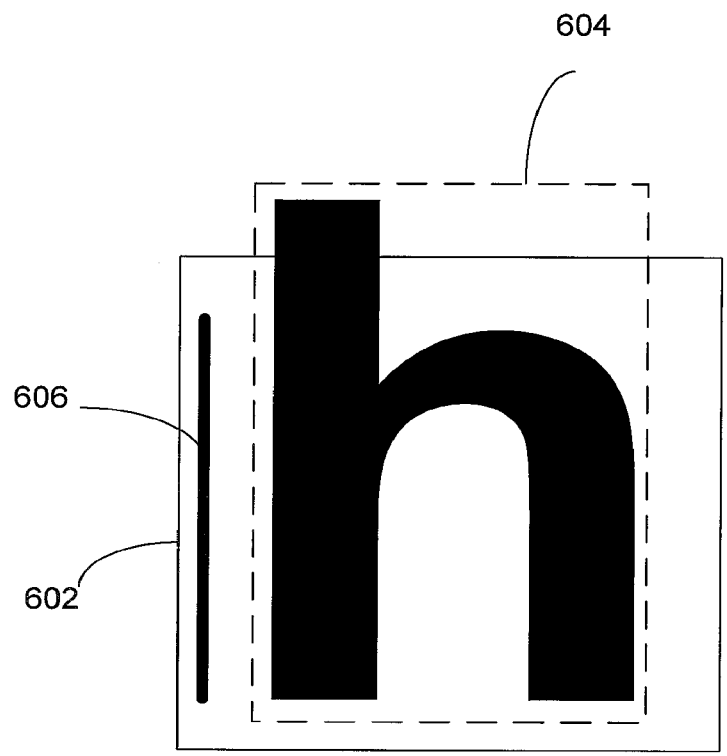
FIG. 6A illustrates a tile that partially contains a feature.

FIG. 6A illustrates a tile 602, a portion of which contains a portion of a feature 604. The letter "h" comprises feature 604. A portion of feature 604 extends above tile 602. Also in tile 602 is object 606. In an embodiment, object 606 may be identified as a feature, or as part of feature 604.

Figure 6B:
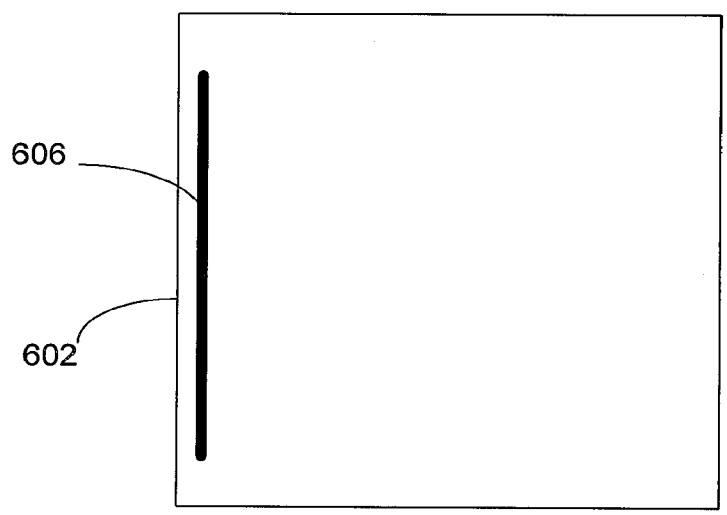
FIG. 6B illustrates the tile of FIG. 6A after the feature has been removed and replaced with the dominant characteristic of the tile.

FIG. 6B illustrates tile 602 of FIG. 6A after the feature 604 has been removed and replaced with the dominant characteristic of the tile. "Dominant characteristic" is used herein to denote an image that, if used to replace the feature in the tile, will aid in compressing the tile. Often, the dominant characteristic of a tile is the dominant color of a tile—the one color found most often within the portion of the tile unoccupied by the feature. In the present embodiment, despite the presence of object 606, the dominant characteristic is the white background that occupies most of the tile, so feature 604 is replaced with all white.

In an embodiment where the feature occupies the entire tile, the tile may be thought of as having no dominant characteristic, not having a portion unoccupied by the feature from which to determine such a dominant characteristic. In this case, the feature may be replaced with an image that is easily compressible, such as a solid color. It may be beneficial to use the same dominant characteristic for all such tiles that are completely occupied by features, as that would increase the number of cache hits for the tiles, and therefore reduce the number of tiles that need to be sent to the client.

Figure 7:
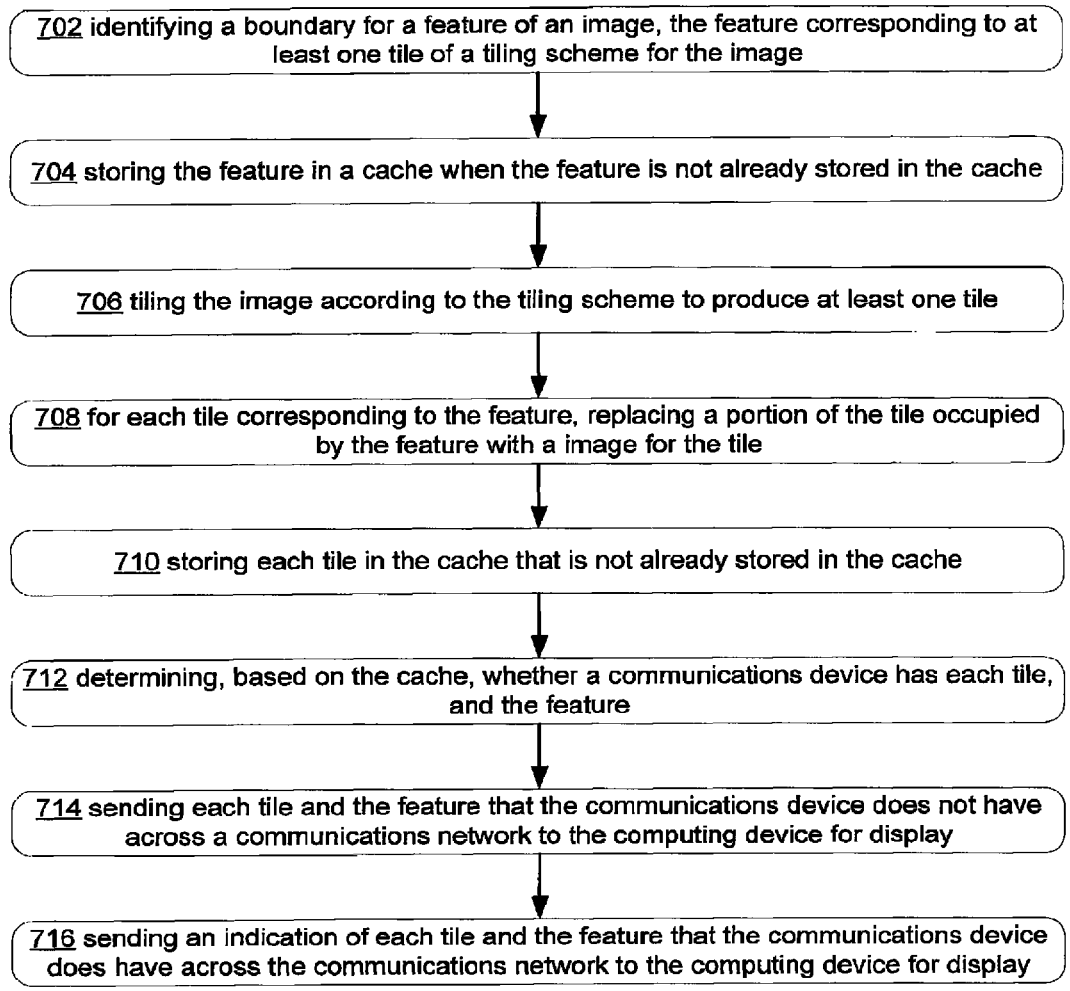
FIG. 7 illustrates exemplary operational procedures for a server accelerating bitmap remoting by extracting non-grid tiles from source bitmaps.

FIG. 7 illustrates exemplary operational procedures for a server accelerating bitmap remoting by extracting non-grid tiles from source bitmaps. It should be appreciated that not every operation must be executed in every embodiment of the present disclosure, but that many functional subsets and permutations of these operational procedures may be implemented.

Operation 702 depicts identifying a boundary for a feature of an image, such as image 202, the feature corresponding to at least one tile of a tiling scheme for the image. This may be accomplished, for example, by using the techniques discussed previously with regard to FIGS. 3 and 4. In an embodiment, the tiling scheme involves dividing the image into a grid of rectangular tiles. A feature is not restricted to this grid and may occur over all or part of a plurality of tiles, part of a single tile, or occupy exactly one tile.

In an embodiment, identifying a boundary for a feature of an image is based on a feature granularity and is performed by a host communications device. A feature granularity may be something that affects how a feature is recognized, such as a size. In an embodiment, the feature granularity may indicate that individual letters are to be treated as separate features. In an embodiment, the feature granularity may indicate that individual words are to be treated as separate features.

In an embodiment the feature granularity is determined by a characteristic of the server (or "host communications device"), the client (or "communications device"), or the communications network. A characteristic of the host communications device, the communications device, or the communications network may be something that affects performance of the remote presentation session, such as the size of a packet sent across the communications network, or the particularities of the system architecture of the host communications device.

In an embodiment, identifying a boundary comprises producing a black-and-white representation of the image as discussed with regard to FIG. 3. In an embodiment, producing a black-and-white representation of the image comprises processing the image according to a thresholding scheme as discussed with regard to FIG. 3. In an embodiment, identifying a boundary for a feature comprises processing the image with a connected segments algorithm as discussed with regard to FIG. 4.

In an embodiment, the feature comprises text, and identifying a boundary for the feature comprises processing the image with an optical character recognition (OCR) algorithm. The resulting text may be stripped from the image, such as by replacing it within each tile of the image with the dominant characteristic of each tile, as discussed in more detail below. Then the tiles may be sent, along with the text (such as expressed in American Standard Code for Information Interchange—ASCII—format), and an indication of where to overlay the text on the tiles, as discussed in more detail below.

In an embodiment, the feature comprises a horizontal or vertical line. The server may perform a run-length counting algorithm on the image, both vertically and horizontally. This algorithm will determine strings of matching or closely matching linear pixels (such as those pixels that are all above or below a threshold value). These lines may then be extracted from each tile of the image, such as by replacing it within each tile of the image with the dominant characteristic of each tile, as discussed in more detail below. The lines may then be separately encoded (such as by indicating start and stop coordinates within the image, the line color, and the line width), and sent to the client for display with the tiles, as discussed in more detail below.

In an embodiment, the feature comprises a screen-to-screen move (or "screen-to-screen blit"), such as when a window is scrolled, and identifying a boundary for the feature comprises processing the image to determine a motion vector of a portion of the image relative to a portion of the prior image. The server may match motion vectors between a plurality of images that are sent, or to be sent, to the client. The server may match motion vectors by determining patterns of where image characteristics, such as text and lines (as determined in the image using the above techniques) have moved. This may then be represented to the client, by using much less bandwidth than sending each tile, such as by indicating in which direction and how far the image has moved.

These techniques with regard to features may be run in combination—e.g. both text and lines may be extracted from an image that is scrolled.

Operation 704 depicts storing the feature in a cache when the feature is not already stored in the cache. A server may maintain a cache of features, such as by performing a hash algorithm on each feature as it is encountered, and storing a signature of the feature in the cache based on the results of the hash algorithm, and a corresponding position of the feature where it will be stored in a client cache. The signature of the feature may be stored rather than the feature itself to minimize storage requirements. In doing so, as each new feature is encountered, the server may determine whether the feature has been previously encountered, so only a reference to the feature must be sent to the client (the case where a cache hit is determined, and it is further determined that the feature is identical to a feature stored in the cache that caused the hit), or that the feature has not been previously encountered, so that the feature itself must be sent to the client (the case where there is no cache hit, which indicates that an identical feature has not been encountered previously).

In an embodiment, a cache has a maximum size, and thus a limited horizon. Thus, when a cache has reached its maximum size, a determination is made on which features and/or tiles must be removed to make room. This determination may be made based on a heuristic of which features and/or tiles are least likely to be repeated, and therefore least beneficial to have in the cache. Similarly, where the cache has reached its maximum size, or may reach its maximum size, a similar determination may be made concerning whether to add a new feature and/or tile to the cache.

In an embodiment, a cache comprises a highly structured (hierarchical) cache. Such a highly structured cache may be organized based on different levels of granularity—such as features, groups of features, and groups of groups of feature.

For instance, where features like "a," "n," and "d" are encountered, groups of those features—the word "and" may be encountered as well. And groups that comprise such groups of features—such as phrases that contain the word "and" may be encountered as well. These groups of features may be cached in addition to the features themselves.

Operation 706 depicts tiling the image according to the tiling scheme to produce at least one tile, similar to the tile of FIG. 6. In an embodiment, a tile has the dimensions of 12 pixels by 12 pixels, unless the image does not have dimensions that are an even multiple of 12 pixels. In that case, no more than one tile in each column and one tile in each row may have dimensions of less than 12 pixels by 12 pixels.

Operation 708 depicts for each tile corresponding to the feature, replacing a portion of the tile occupied by the feature with a image for the tile. This may be accomplished, for example, by using the techniques discussed previously with regard to FIGS. 6A and 6B.

Operation 710 depicts storing each tile in the cache that is not already stored in the cache. In an embodiment, storing a tile is effectuated similar to storing a feature as discussed in operation 704. In an embodiment, tiles and features are stored in separate caches. In an embodiment, tiles and features are stored in a single cache. As it more likely that a tile will collide with a tile and a feature will collide with a feature, than one with the other, there may be performance benefits on certain systems to using two caches. Likewise, the particulars of a given system may favor the use of a single cache.

Operation 712 depicts determining, based on the cache, whether a communications device has each tile, and the feature. In an embodiment, this communications device is the client. As the server sends tiles and features to the client, the client caches those tiles and features in one or more caches of its own. The client cache may comprise a stored tile or feature and a corresponding result of the hash algorithm performed on the tile or feature, So, if the server determines that a tile or feature that represents the same image as the present tile or feature already exists in its cache (done by looking at feature signatures), it has determined that the client already has the tile or feature in its cache (or will be sent the tile or feature in transmitting data for the current image). If there is no cache hit, then the client does not have the tile or feature. If there is a cache hit, and the server determines that no previously cached tile or feature that caused the hit (within the cache horizon) is identical to the present tile or feature, then the client does not have the tile or feature. Otherwise, the server determines that the client does (or soon will) have the tile or feature.

Operation 714 depicts sending each tile and the feature that the communications device does not have across a communications network to the computing device for display. Each tile and feature that the client does not have may be determined according to the techniques of operation 712. In an embodiment, each tile and feature is sent as a separate image within the context of the active remote presentation session. In an embodiment, the server may improve session performance by grouping together features into a single bitmap of features and/or tiles, and sending this compound bitmap to the client along with an indication of which portion of the compound bitmap corresponds to each feature and tile. In an embodiment, a separate compound bitmap may be used each for features and for tiles.

In an embodiment, at least some of the tiles and features sent to the client are first compressed before they are sent, and then uncompressed by the client after it has received them.

Operation 716 depicts sending an indication of each tile and the feature that the communications device does have across the communications network to the computing device for display. Each tile and feature that the client has may be determined according to the techniques of operation 712. For instance, a tile may be accompanied by two integral values—one that indicates a number of pixels below the upper left hand corner that the upper left hand corner of the tile is to be placed, and one that indicates a number of pixels to the right of the upper left hand corner that the upper left hand corner of the tile is to be placed In an embodiment, the tile(s), feature(s) and indication(s) thereof sent according to the techniques of operations 714 and 716 are sent along with an indication of where the client is to place the corresponding tile or feature in the image that it recreates.

Figure 8:
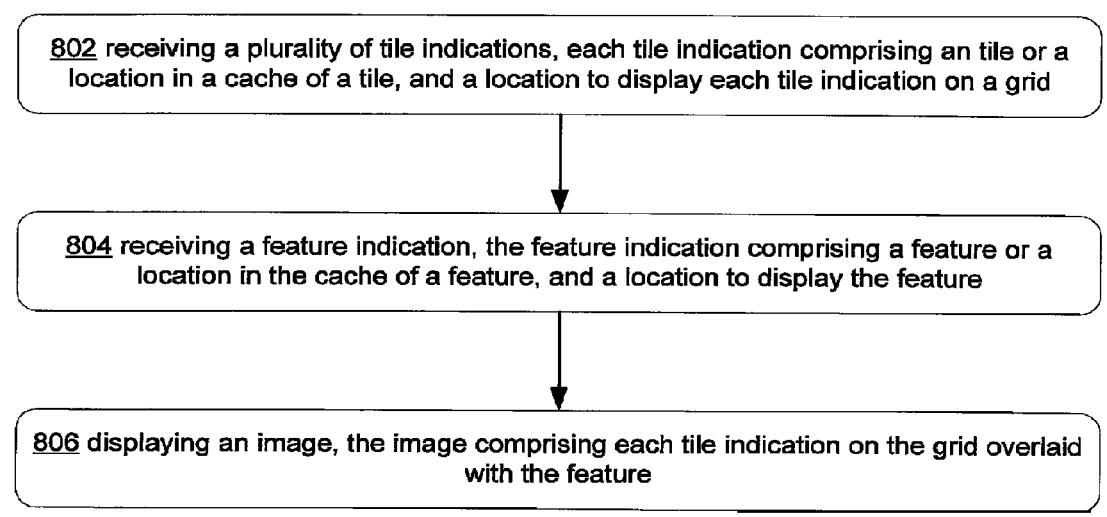
FIG. 8 illustrates exemplary operational procedures for a client accelerating bitmap remoting by extracting non-grid tiles from source bitmaps.

FIG. 8 illustrates exemplary operational procedures for a client accelerating bitmap remoting by extracting non-grid tiles from source bitmaps. It should be appreciated that not every operation must be executed in every embodiment of the present disclosure, but that many functional subsets and permutations of these operational procedures may be implemented.

Operation 802 depicts receiving a plurality of tile indications, each tile indication comprising an tile or a location in a cache of a tile, and a location to display each tile indication on a grid.

Operation 804 depicts receiving a feature indication, the feature indication comprising a feature or a location in the cache of a feature, and a location to display the feature.

In an embodiment where, the feature indication comprises a plurality of features, as discussed in more detail with regard to FIG. 7, and an indication of the location of each feature within the feature indication, the client may determine each feature within the feature indication based on each indication of the location of each feature.

In an embodiment, the feature comprises text, a line, or a motion between the image and a previously received image. In an embodiment where the feature comprises text, the feature indication comprises an indication of a font with which to display the text.

Operation 806 depicts displaying an image, the image comprising each tile indication on the grid overlaid with the feature.

CONCLUSION

While the present disclosure has been described in connection with the preferred aspects, as illustrated in the various figures, it is understood that other similar aspects may be used or modifications and additions may be made to the described aspects for performing the same function of the present disclosure without deviating therefrom. Therefore, the present disclosure should not be limited to any single aspect, but rather construed in breadth and scope in accordance with the appended claims. For example, the various procedures described herein may be implemented with hardware or software, or a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium. When the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only.

What is claimed:

1. A method, comprising:
   identifying, by a server, a boundary for a feature of an image, the feature corresponding to at least one tile of a tiling scheme for the image;
   storing, by the server, the feature in a cache when the feature is not already stored in the cache;
   tiling, by the server, the image according to the tiling scheme to produce at least one tile;
   for each tile corresponding to the feature, replacing a portion of the tile occupied by the feature with a replacement image for the tile;
   storing each tile in the cache that is not already stored in the cache;
   determining, based on the cache, that a communications device has the feature; and
   sending an indication of the feature to the communications device.

2. The method of claim 1, further comprising:
   determining, based on the cache, whether the communications device has each tile;
   sending each tile that the communications device does not have across a communications network to the computing device for display; and
   sending an indication of each tile that the communications device does have across the communications network to the computing device for display.

3. The method of claim 2, wherein determining, based on the cache, whether the communications device has the feature comprises:
   determining that the communications device has the feature when caching the feature causes a cache hit of the cache and a cached feature of the cache represents the same image as the feature.

4. The method of claim 2, wherein identifying the boundary for the feature of the image is based on a feature granularity and is performed by a host communications device, and wherein the feature granularity is determined by a characteristic of the host communications device, the communications device, or the communications network.

5. The method of claim 2, further comprising compressing the at least one tile or the feature before sending the tile or the feature to the communications device.

6. The method of claim 1, wherein identifying a boundary for a feature of an image further comprises:
   producing a black-and-white representation of the image.

7. The method of claim 6, wherein producing a black-and-white representation of the image comprises:
   processing the image according to a thresholding scheme.

8. The method of claim 1, wherein identifying the boundary for the feature comprises:
   processing the image with a connected segments algorithm.

9. The method of claim 1, wherein the feature is already stored in the cache, further comprising:
   identifying a second boundary for a second feature of the image;
   determining that the second feature is not already stored in the cache;
   producing a compound feature comprising the feature and the second feature; and
   sending the compound feature across a communications network to the communications device, with an indication of how the feature and the second feature are stored within the compound feature.

10. The method of claim 1, wherein the feature comprises text, and identifying the boundary for the feature comprises:
    processing the image with an optical character recognition (OCR) algorithm.

11. The method of claim 1, wherein the feature comprises a line, and identifying the boundary for the feature comprises:
    identifying as the feature a plurality of linear pixels of a substantially similar color.

12. The method of claim 1, wherein the feature comprises a motion between the image and a prior image, and identifying the boundary for the feature comprises:
    processing the image to determine a motion vector of a portion of the image relative to a portion of the prior image.

13. The method of claim 1, wherein the replacement image for a tile comprises a dominant color of the tile.

14. The method of claim 1, wherein identifying the boundary for the feature of the image is based on a feature granularity.

15. The method of claim 1, further comprising:
    identifying a second boundary for a second feature of the image;
    determining that the feature and the second feature represent the same image;
    sending the feature across a communications network to the communications device; and
    sending an indication that the second feature corresponds to the feature across the communications network to the communications device.

16. A computer-readable storage device bearing computer-readable instructions that, when executed by a computing device, cause the computing device to perform operations comprising:
    identifying a boundary for a feature of an image, the feature corresponding to at least one tile of a tiling scheme for the image;
    storing the feature in a cache when the feature is not already stored in the cache;
    tiling the image according to the tiling scheme to produce at least one tile;
    for each tile corresponding to the feature, replacing a portion of the tile occupied by the feature with an image for the tile to produce tiles;
    storing each tile in the cache that is not already stored in the cache;
    determining, based on the cache, whether a second computing device has each tile, and the feature;
    sending each tile and the feature that the second computing device does not have across a communications network to the computing device for display; and
    sending an indication of each tile and the feature that the communications device does have across the communications network to the computing device for display.

17. A computer system comprising a processor communicatively coupled to a computer-readable storage device, wherein the computer-readable storage device stores instructions that when executed on the processor cause the system to:
    identify a boundary for a feature of an image, the feature corresponding to at least one tile of a tiling scheme for the image;
    store the feature in a cache when the feature is not already stored in the cache;
    tile the image according to the tiling scheme to produce at least one tile;

for each tile corresponding to the feature, replace a portion of the tile occupied by the feature with a replacement image for the tile;

store each tile in the cache that is not already stored in the cache;

determine, based on the cache, that a communications device has the feature; and send an indication of the feature to the communications device.

18. The system of claim 17, further comprising instructions to cause the system to:

determine, based on the cache, whether the communications device has each tile;

send each tile that the communications device does not have across a communications network to the computing device for display; and send an indication of each tile that the communications device does have across the communications network to the computing device for display.

19. The system of claim 18, wherein the determine operation comprises:

determine that the communications device has the feature when caching the feature causes a cache hit of the cache and a cached feature of the cache represents the same image as the feature.

20. The system of claim 18, wherein the identify operation is based on a feature granularity and is performed by a host communications device, and wherein the feature granularity is determined by a characteristic of the host communications device, the communications device, or the communications network.

* * * * *